(12) United States Patent
Wu

(10) Patent No.: US 7,165,862 B2
(45) Date of Patent: Jan. 23, 2007

(54) DIRECT BACKLIGHT MODULE

(75) Inventor: Chih-Kang Wu, Longtan Township, Taoyuan County (TW)

(73) Assignee: Au Optronics Corp., Hsinchu (TW)

( * ) Notice: Subject to any disclaimer, the term of this patent is extended or adjusted under 35 U.S.C. 154(b) by 158 days.

(21) Appl. No.: 10/812,960

(22) Filed: Mar. 31, 2004

(65) Prior Publication Data

US 2005/0047111 A1    Mar. 3, 2005

(30) Foreign Application Priority Data

Aug. 27, 2003    (TW) .............................. 92123670 A

(51) Int. Cl.
  *F21V 7/20*    (2006.01)
  *F21V 29/00*    (2006.01)
(52) U.S. Cl. ..................... 362/218; 362/97; 362/294; 362/373
(58) Field of Classification Search ............ 362/29–30, 362/97, 260, 217–218, 223–225, 362, 373, 362/294, 632–634; 349/58, 61, 70
See application file for complete search history.

(56) References Cited

U.S. PATENT DOCUMENTS

| | | | | |
|---|---|---|---|---|
| 5,726,722 A | * | 3/1998 | Uehara et al. ................. | 349/66 |
| 6,089,739 A | * | 7/2000 | Yamamoto et al. .......... | 362/561 |
| 6,580,477 B1 | * | 6/2003 | Cho .............................. | 349/65 |
| 6,642,974 B2 | * | 11/2003 | Liao ............................. | 349/64 |
| 6,655,810 B2 | * | 12/2003 | Hayashi et al. .............. | 362/600 |
| 6,880,947 B2 | * | 4/2005 | Hsieh et al. .................. | 362/614 |
| 6,964,496 B2 | * | 11/2005 | Yang et al. ................... | 362/220 |
| 2002/0149713 A1 | * | 10/2002 | Ishida et al. .................. | 349/58 |
| 2005/0140843 A1 | * | 6/2005 | Shimizu ....................... | 349/58 |
| 2005/0253981 A1 | * | 11/2005 | Kruijt et al. .................. | 349/70 |

FOREIGN PATENT DOCUMENTS

| JP | 2001-297623 | | 10/2001 |
|---|---|---|---|
| JP | 2001283624 A | * | 10/2001 |
| JP | 2003-084280 | | 3/2003 |

OTHER PUBLICATIONS

Kuodou:KK, English Translation of Hirashiro (JP 2001-283624), Oct. 2001, http:www19.ipdl.ncipi.go.jp/PA1/result/detail/main/wAAAPMa40IDA413283624P1.htm, Abtsract pp. 1-2, Description pp. 1-7, Drawings pp. 1-3.*

* cited by examiner

*Primary Examiner*—Sandra O'Shea
*Assistant Examiner*—Jason Moon Han
(74) *Attorney, Agent, or Firm*—Rabin & Berdo, P.C.

(57) ABSTRACT

A direct backlight module includes a reflective base, a buffer block, a lamp tube and a casing. Two opposite side regions of the reflective base both have two opposite openings located at two ends of each side region separately. The buffer block is disposed on the reflective base and positioned opposite to one of the openings. The lamp tube has two opposite electrodes at two ends of the lamp tube separately, and one of the electrodes is mounted in the buffer block. The casing covers the buffer block and there is an airflow channel formed by the combination of the inner chamber of the casing and the openings when the casing is installed in the reflective base.

12 Claims, 6 Drawing Sheets

DIRECT BACKLIGHT MODULE

This application claims the benefit of Taiwan application Serial No. 092123670, filed Aug. 27, 2003, the subject matter of which is incorporated herein by reference.

BACKGROUND OF THE INVENTION

1. Field of the Invention

The invention relates in general to a backlight module, and more particularly to a direct backlight module for a thin-film transistor liquid crystal display.

2. Description of the Related Art

Liquid crystal displays (LCDs) have been widely used as large displays such as screens of desktop computers and small displays such as portable information terminals because LCDs have the characteristics of thin shape, light weight, low power dissipation. However, a LCD is not a self-luminescent display so that a backlight module is required as the light sources.

FIG. 1 shows a conventional direct backlight module. Referring to FIG. 1, a direct backlight module 100 includes a reflective base 110, several lamp tubes 120 and a lamp-supporting frame 130. The lamp tubes 120 are light sources of the direct backlight module 100 and light emitted from the lamp tubes 120 are reflected to a LCD display by the reflective base 110.

The lamp tubes 120 are disposed on the reflective base 110 via several buffer blocks 115 within the lamp-supporting frame 130. In another words, two ends of the lamp tubes 120 are mounted in the buffer blocks 115 separately, and the buffer blocks 115 are covered and enclosed by the lamp-supporting frame 130 so that the lamp tubes can be connected with the lamp-supporting frame 130. Then, the lamp-supporting frame 130 is assembled with the reflective base 110 so that the lamp tubes 120 are further sposed above the reflective base 110.

However, the buffer rubbers 115, as bad conductors of heat, are covered and enclosed by the lamp-supporting frame 130, and heat generated from two ends of the lamp tube 120 is kept and accumulated inside the buffer blocks 115. As a result, the temperature of the whole direct backlight module 100 can be easily raised, and cause the great effect on the luminance performance of the direct backlight module.

SUMMARY OF THE INVENTION

In view of the foregoing, it is an object of the present invention to provide an improved direct backlight module of which heat generated from two electrodes of a lamp tube is not accumulated inside a buffer block and is transmitted outside of the backlight module. As a result, the luminance performance of the direct backlight module is improved.

The invention achieves the above-identified objects by providing a direct backlight module including a reflective base, a buffer block, a lamp tube and a casing. Two opposite side regions of the reflective base both have two opposite openings located at two ends of each side region separately. The buffer block is disposed on the reflective base and positioned opposite to one of the openings. The lamp tube has two opposite electrodes at two ends of the lamp tube separately, and one of the electrodes is mounted in the buffer block. The casing covers the buffer block and there is an airflow channel formed by the combination of the inner chamber of the casing and the openings when the casing is assembled with the reflective base. Also, the lamp tube, the buffer block and the airflow channel can be constructed on the same level.

Other objects, features, and advantages of the invention will become apparent from the following detailed description of the preferred but non-limiting embodiments. The following description is made with reference to the accompanying drawings.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like components throughout.

Figure 1:
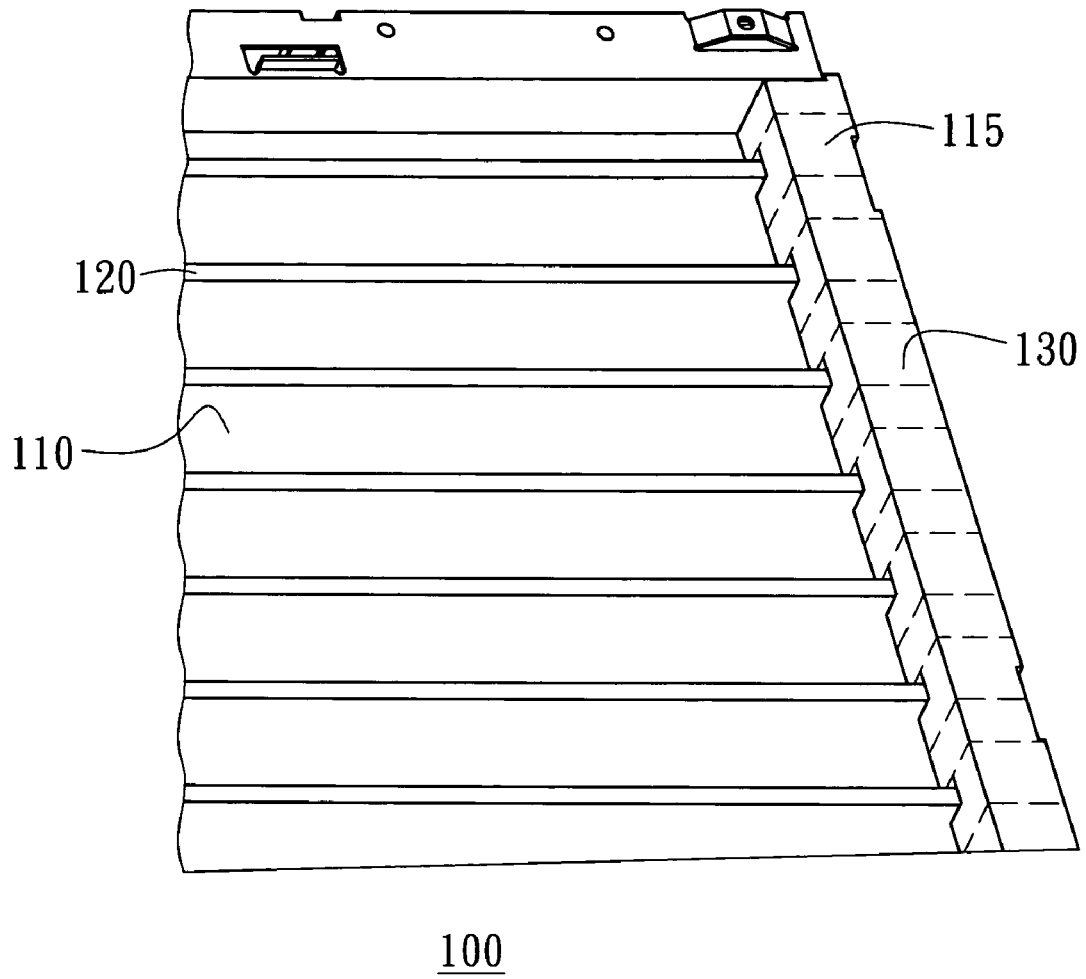
FIG. 1 (Prior Art) shows a conventional direct backlight module.
Figure 2A:
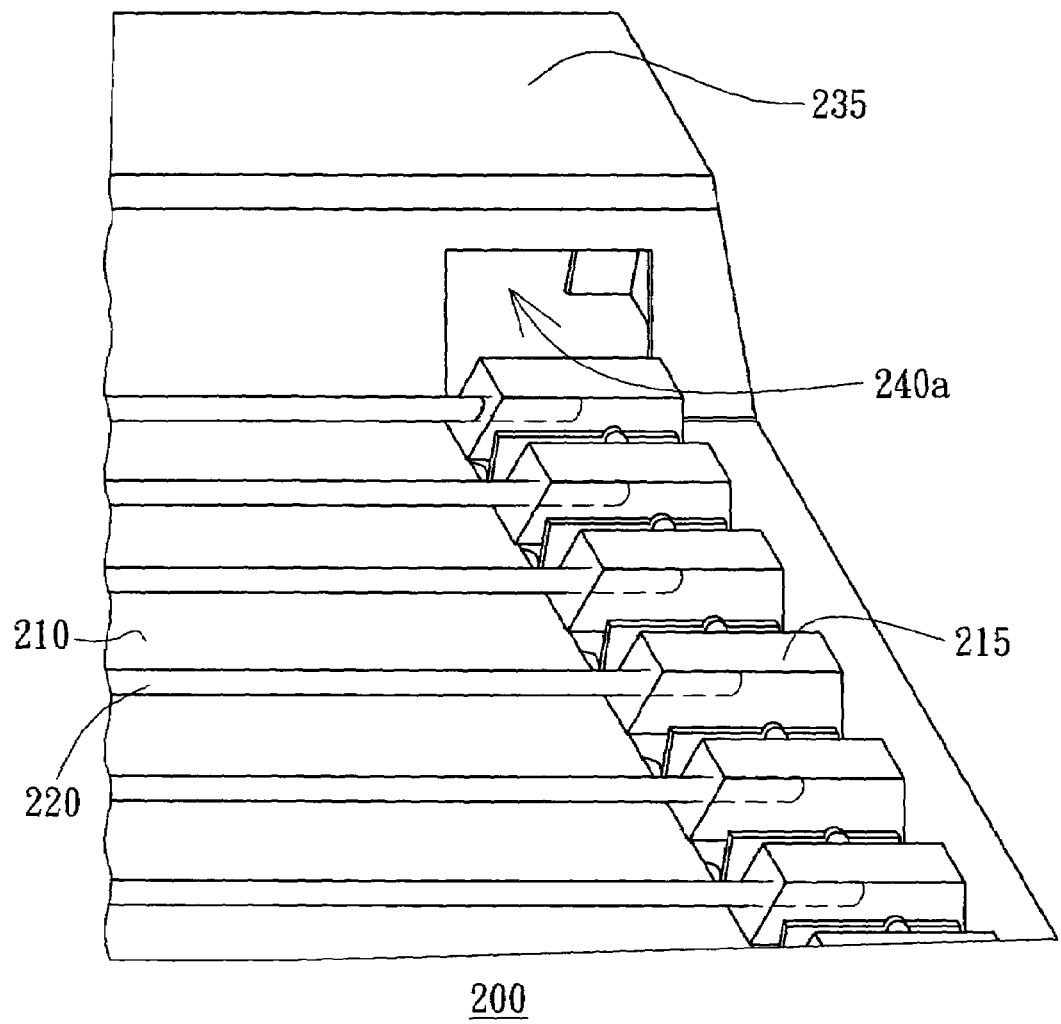
FIG. 2A shows portions of the direct backlight module according to a preferred embodiment of the invention.
Figure 2B:
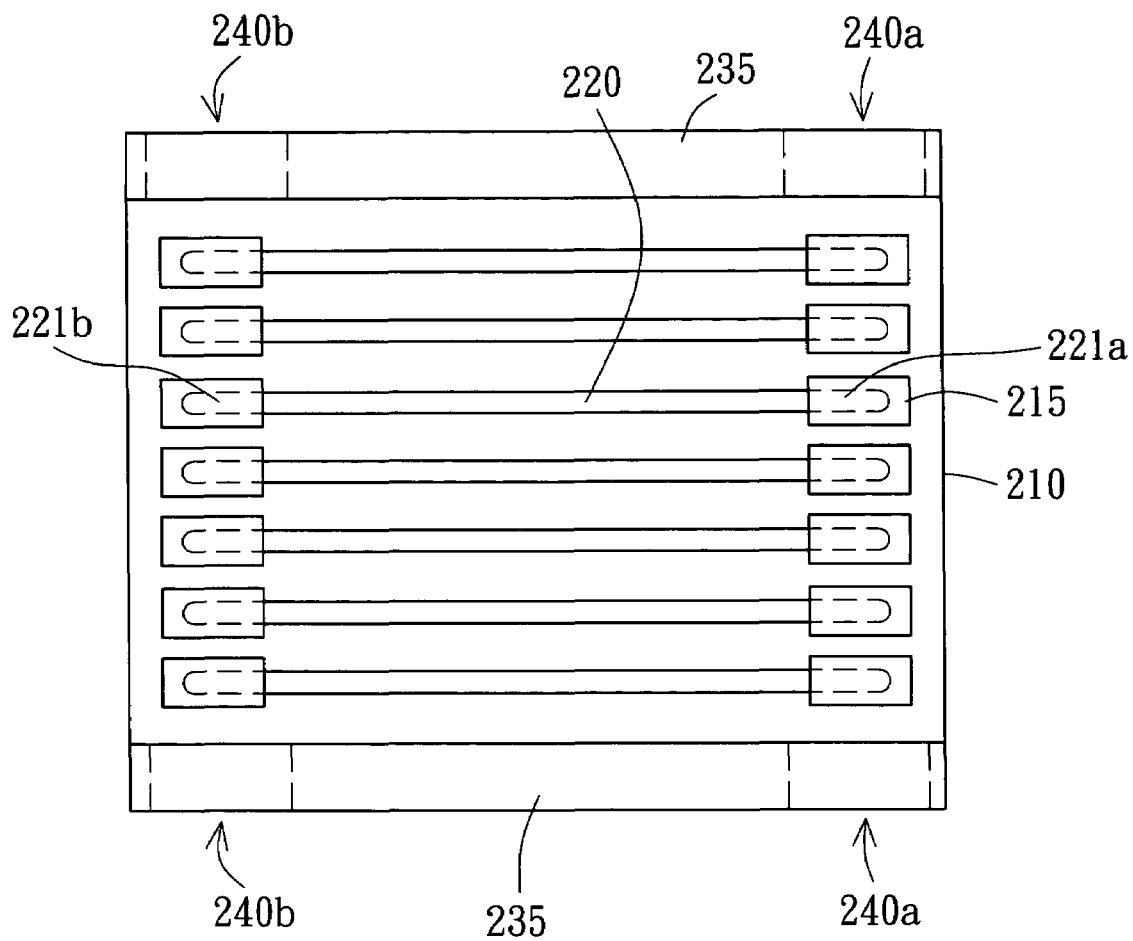
FIG. 2B is a vertical perspective view showing the backlight module prior to installing the casing according to FIG. 2A.

FIG. 2A shows portions of the direct backlight module according to a preferred embodiment of the invention, and FIG. 2B is a vertical perspective view showing the backlight module prior to installing the casing according to FIG. 2A. Referring to both FIG. 2A and FIG. 2B, a direct backlight module 200 includes a reflective base 210, several buffer blocks 215, several lamp tubes 220 and two casings 230a, 230b (shown in FIG. 3). The lamp tubes 220 are light sources of the direct backlight module 200 and light emitted from the lamp tubes 220 are reflected to a LCD display by the reflective base 210.

Two opposite side regions 235 of the reflective base 210 protrude from the reflective base 210. There are two opposite openings 240a, 240b disposed at two ends of each side region 235 separately. The buffer blocks 215 are disposed on the reflective base 210 and positioned oppositely to one of the openings 240a, 240b. Each of the lamp tube 220 has two opposite electrodes 221a, 221b at the respective two ends of the lamp tube 220, and the electrodes 221a, 221b are mounted in the respective buffer blocks 215.

Figure 3:
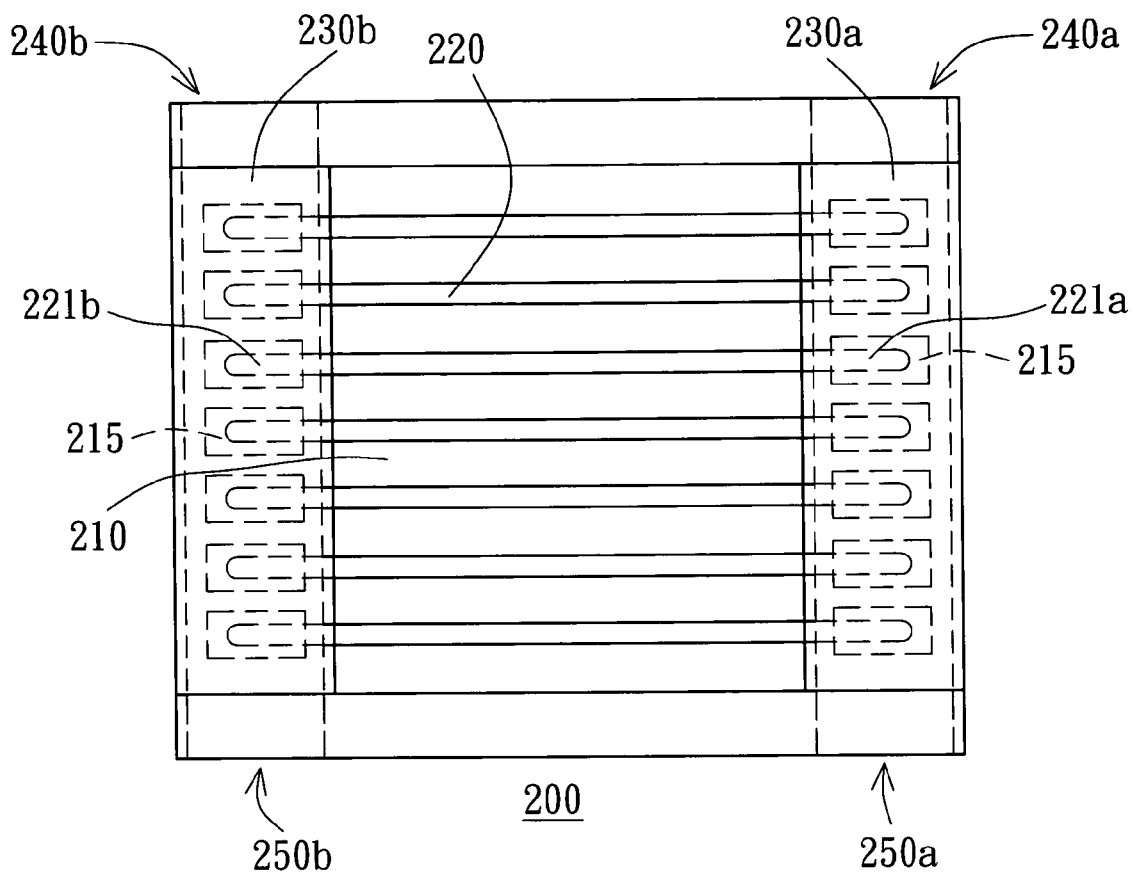
FIG. 3 is a vertical perspective view showing the backlight module installed in the casing according to FIG. 2A.
Figure 4:
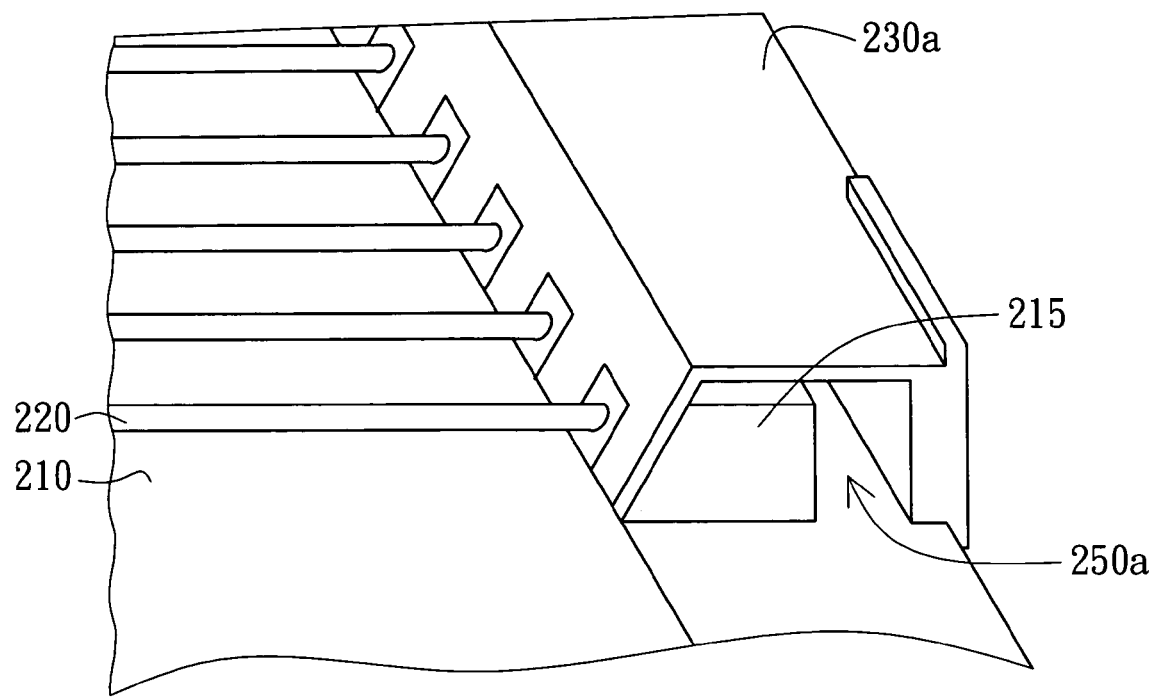
FIG. 4 shows the ends of the lamp tubes mounted in the buffer blocks and the buffer blocks covered by the casing.

FIG. 3 is a vertical perspective view showing the backlight module installed in the casing according to FIG. 2A. Referring to FIG. 3 and FIG. 2B, the casings 230a, 230b are assembled with the reflective base 210 and cover the buffer blocks 215. FIG. 4 shows the ends of lamp tubes mounted in the buffer blocks and the buffer blocks covered by the casing. The casing 230a between the frame 260 (FIG. 5) and the reflective base is mounted to the reflective base 210. As can be seen in FIG. 4, the casing 230a includes a top wall, a first side wall and a second side wall, wherein the first side wall is spaced from the second side wall, and both of first and second side walls are fixed to the reflective base 210. The top side wall joins the first and second side walls opposite the reflective base 210. A chamber is defined by the reflective base 210, the top wall, and the first and second side walls. One of the electrodes of the lamp tube is disposed in the chamber. As can be seen in FIG. 3, an airflow channel 250a is formed by the combination of the chamber (defined by the reflective base 210 and the casing 230a) and the openings 240a. Also, an airflow channel 250b is formed by the combination of the chamber (defined by the reflective base 210 and the casing 230b) and the openings 240b.

As can be seen in FIG. 4, the buffer blocks 215 are disposed on the reflective base 210 and covered by the casing 230a. Referring to FIG. 2A, FIG. 3, and FIG. 4 together, the casings 230a, 230b are hollow; and two ends of the casings 230a, 230b communicate with the openings 240a, 240b, so as to form the airflow channels 250a, 250b within the casings 230a, 230b, respectively. Therefore, the heat generated from the two electrodes 221a, 221b of each lamp tube 220 is radiated from the buffer blocks 215 and then transmitted out of the backlight module 200 through the airflow channels 250a, 250b efficiently. Also, it is noted that the lamp tubes 220, the buffer blocks 215 and the airflow channels 250a, 250b are set on the same level. As shown in FIG. 4, the lamp tubes 220, the buffer blocks 215 and the airflow channels 250a, 250b are set on the level of the reflective base 210. Most of conventional designs construct the buffer blocks, the lamps and the reflective base at the same level (usually a higher level), and construct the airflow channel(s) at a different level (usually a lower level). The cooling air in the conventional airflow channel (positioned under the buffer blocks, the lamps and the reflective base) only diffuse heat when the energy generated from the lamp tube has already heated the reflective plate; thus, the heat accumulated in the buffer blocks can not be directly and efficiently removed. Accordingly, using the backlight module of the invention, the conventional problem of heat accumulated within the buffer blocks 215 can be efficiently solved.

Figure 5:
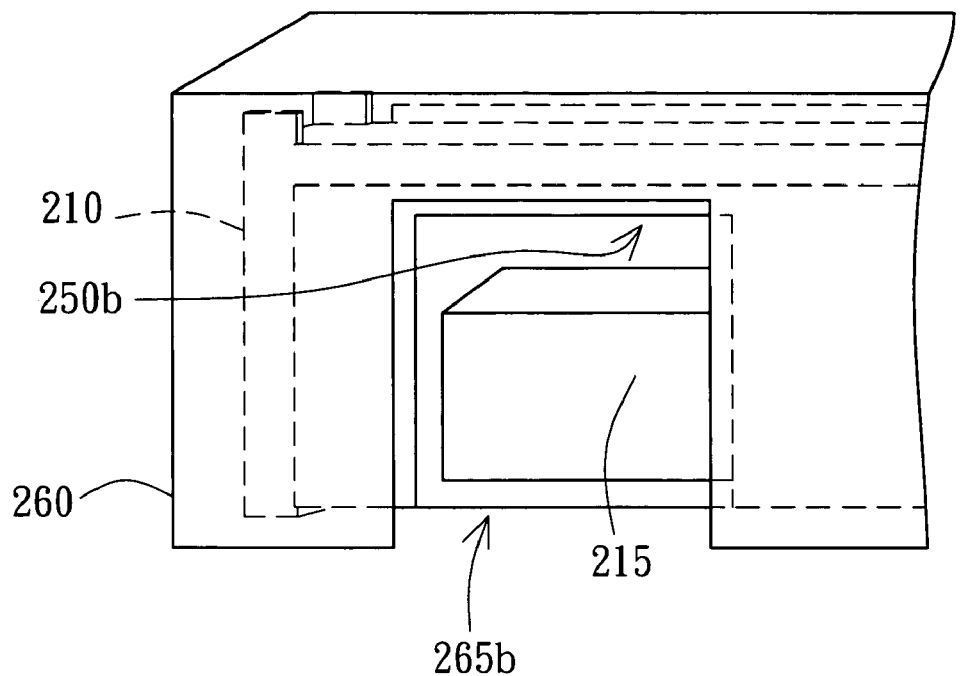
FIG. 5 is a perspective view showing a frame covering the reflective base.

FIG. 5 is a perspective view showing a frame covering the reflective base. Further, the direct backlight module 200 preferably includes a frame 260 for covering the reflective base 210, and the frame 260 has a hole 265b opposite to and communicated with the airflow channel 250b. Symmetrically, the frame 260 has another hole not shown in FIG. 5 and opposite to and communicated with the airflow channel 250a. Moreover, there could be preferably a fan installed in the frame 260 so that the air can be blown in/out through the airflow channels 250a, 250b.

The hole 265b of the frame 260 facilitates the heat generated from the lamp tube 220 to be transmitted out of the backlight module 200, and the cooler air from outside is exchanged with the waste heat by automatical convection. As for the fan (not shown) installed in the frame 260, it helps the air to be blown in/out through the airflow channels 250a, 250b by forcible convection.

Figure 6:
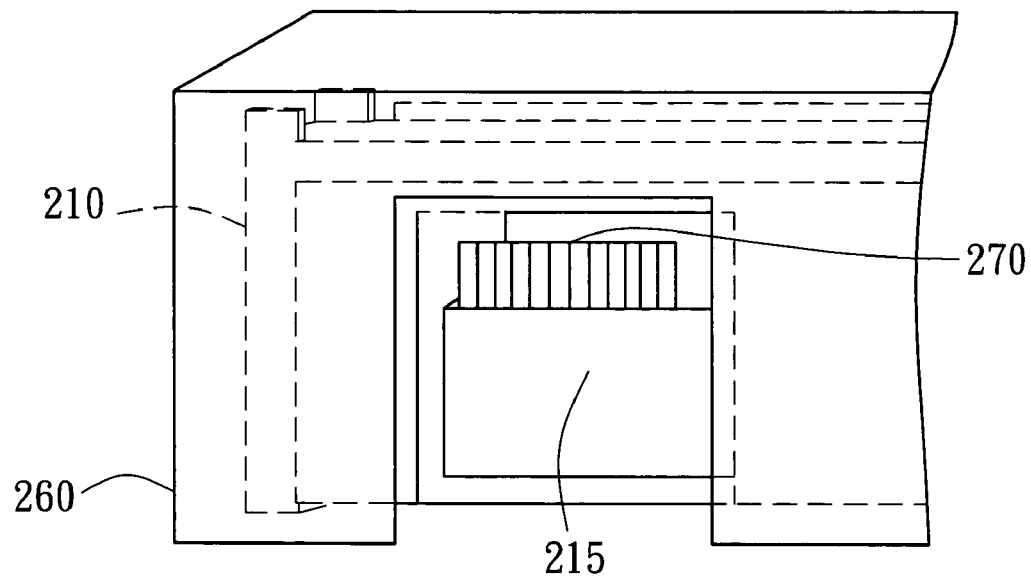
FIG. 6 is a perspective view showing a heat-transmitting fin disposed on the buffer block.

Moreover, referring to FIG. 6, it is a perspective view showing a heat-transmitting fin disposed on the buffer block. The heat-transmitting fins 270 are preferably disposed on the buffer blocks 215 and inside the casings 230a, 230b, so that the heat generated from two electrodes of the lamp tubes 220 (originally accumulated inside the buffer blocks 215) can be transmitted to the outside through the airflow channels 250a, 250b. In addition, the preferred material of the buffer blocks 215 is rubber or a heat-transmitting rubber.

The direct backlight module according to the invention is provided to transmit the waste heat from the lamp tube to the outside by the hollow casings disposed on the buffer blocks. The waste heat can be guided through the buffer blocks, the airflow channels, the holes of the frame, and then transmitted out of the backlight module rather than being accumulated inside the buffer blocks. The direct backlight module of the present invention is apparently improved to overcome the former disadvantages. Moreover, the direct backlight module of the invention is more effective, and lower energy consuming than the conventional.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A direct backlight module, comprising at least:
   a reflective base, having two opposite side regions and two ends of each side region having two opposite openings;
   a lamp tube, having two electrodes respectively at two opposite ends of the lamp tube, wherein the lamp tube is disposed on the reflective base;
   a frame covering the reflective base and the lamp tube;
   a casing between the frame and the reflective base, mounted to the reflective base, the casing including a first side wall and a second side wall spaced from the first side wall, fixed to the reflective base and a top wall joining the first and second side walls opposite the reflective base, so as to define a chamber, one of the electrodes of the lamp tube disposed in the chamber; and
   an airflow channel formed by the combination of the chamber and one of the openings of each of the side regions of the reflective base, the frame having holes opposing opposite ends of the airflow channel;
   wherein the lamp tube and the airflow channel are constructed on the same level.

2. The direct backlight module according to claim 1, wherein there is a fan installed in the frame so that air is blown in/out through the airflow channel.

3. The direct backlight module according to claim 1, further comprising a buffer block disposed on the reflective base and being positioned oppositely to one of the openings of the side region, wherein the electrode is mounted in the buffer block, and the buffer block is covered by the casing.

4. The direct backlight module according to claim 3, wherein the buffer block is constructed on the same level as the lamp tube and the airflow channel.

5. The direct backlight module according to claim 3, further comprising a heat-transmitting fin disposed on the buffer block so that heat given off from the one electrode of the lamp tube and accumulated inside the buffer block is transmitted into the chamber by the heat-transmitting fin.

6. The direct backlight module according to claim 3, wherein the material of the buffer block is rubber.

7. The direct backlight module according to claim 3, wherein the material of the buffer block is a heat-transmitting rubber.

8. A direct backlight module, comprising at least:

a reflective base, having two opposite side regions and two ends of each side region having two opposite openings;

a buffer block disposed on the reflective base and being positioned oppositely to one of the openings;

a lamp tube, having two electrodes respectively at two opposite ends of the lamp tube, wherein one of the electrodes is mounted in the buffer block;

a frame covering the reflective base and the lamp tube;

a casing between the frame and the reflective base, mounted to the reflective base and covering the buffer block, the casing including a first side wall and a second side wall spaced from the first side wall, fixed to the reflective base and a top wall joining the first and second side walls opposite the reflective base, so as to define a chamber, one of the electrodes of the lamp tube disposed in the chamber; and an airflow channel formed by the combination of the chamber and one of the openings of each of the side regions of the reflective base, the frame having holes opposing opposite ends of the airflow channel; and a heat-transmitting fin disposed on the buffer block inside the casing, so that heat generated from the two electrodes of the lamp tube is radiated from the buffer block and the heat-transmitting fin, and then transmitted outside the frame through the airflow channel.

9. The direct backlight module according to claim 8 wherein there is a fan installed in the frame so that air is blown in/out through the airflow channel.

10. The direct backlight module according to claim 8, wherein the material of the buffer block is rubber.

11. The direct backlight module according to claim 8, wherein the material of the buffer block is a heat-transmitting rubber.

12. The direct backlight module according to claim 8, wherein the lamp tube, the buffer block and the airflow channel are constructed on the same level.

* * * * *